Sept. 3, 1963 W. H. BENNETT 3,102,384
PROPULSION MEANS FOR SPACE VEHICLES
Filed Dec. 29, 1961 2 Sheets-Sheet 1
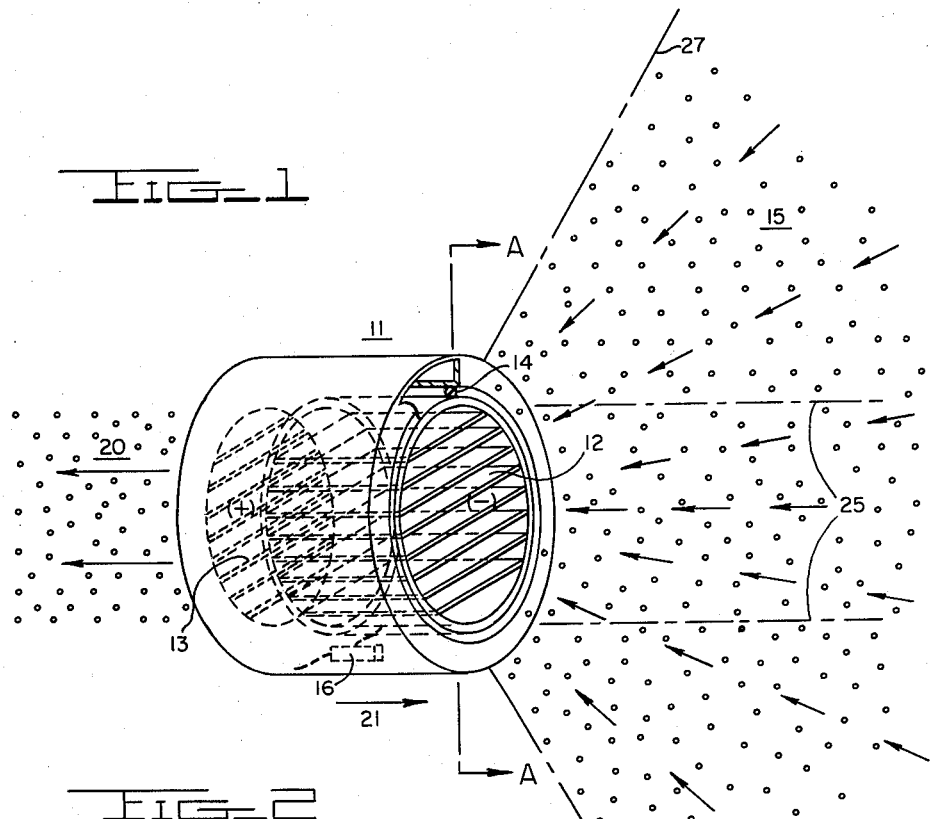
INVENTOR
WILLARD H. BENNETT
BY
ATTORNEY

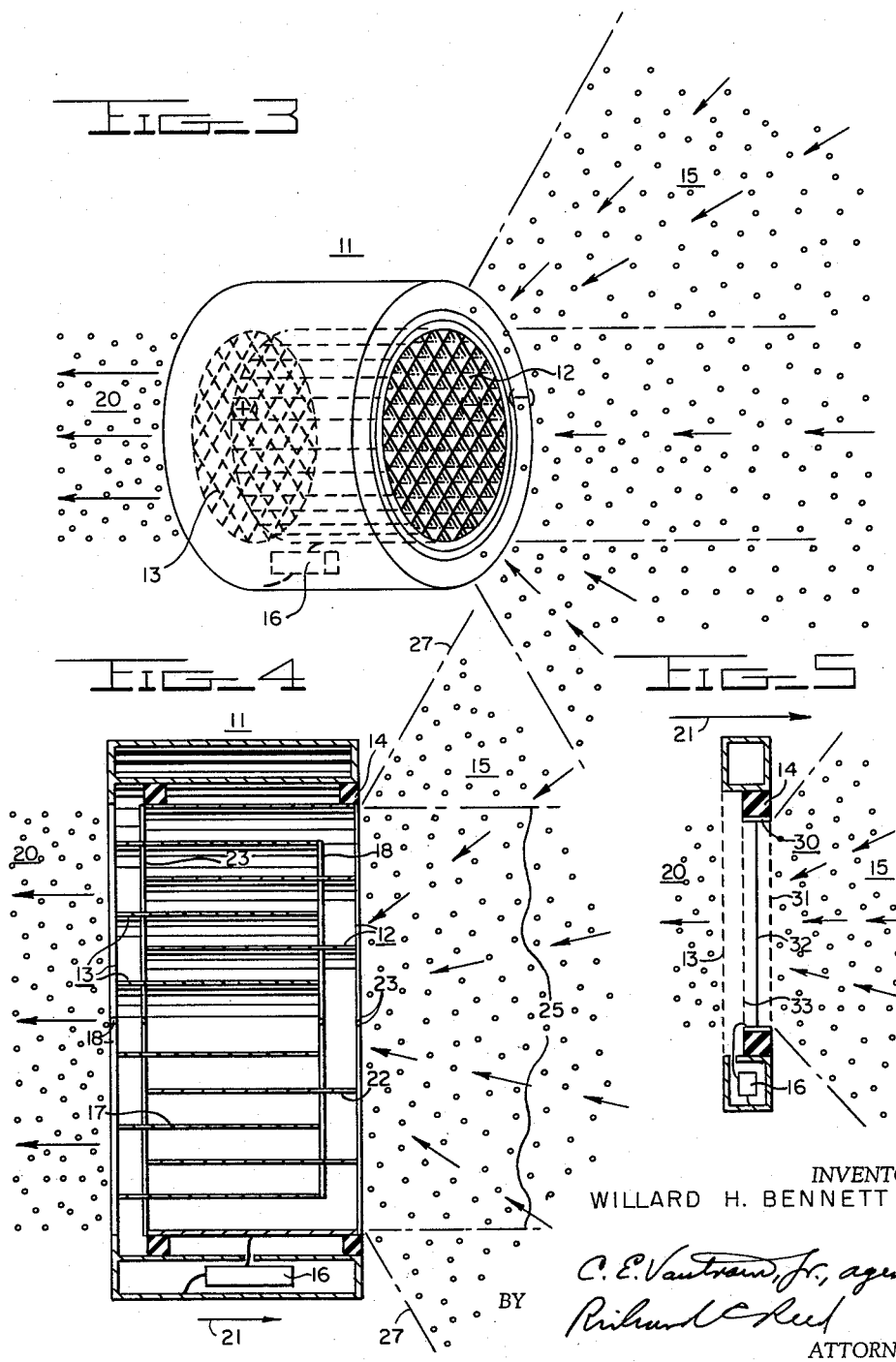

United States Patent Office 3,102,384
Patented Sept. 3, 1963

3,102,384
PROPULSION MEANS FOR SPACE VEHICLES
Willard H. Bennett, 5032 Kaplan Drive, Raleigh, N.C.
Filed Dec. 29, 1961, Ser. No. 163,371
4 Claims. (Cl. 60—35.5)
(Granted under Title 35, U.S. Code (1952), sec. 266)

The invention described herein may be manufactured and used by or for the Government of the United States of America for governmental purposes without the payment of any royalties thereon or therefor.

This invention relates in general to propulsion means and more particularly to propulsion means for space vehicles.

Conventional rocket and presumably prospective space vehicle propulsion is based entirely on chemical propellants which are carried by the vehicle as a part of the payload. Limited space and supply create inherent limitations in the use of such propellants which impose undue restrictions on future space travel. Ion propulsion has been proposed, particularly for low acceleration vehicles, as a replacement for chemical propellants, and it is in an improved ion propulsion system wherein the present invention lies.

Present suggestions in the field of ion propulsion include providing an ion source aboard the space vehicle. Such a provision is unnecessary in the light of the present invention which avoids the disadvantages of both chemical propellants and ion propulsion wherein the ion source is carried on the space vehicle.

Accordingly, it is an object of the present invention to provide propulsion for space vehicles in which there are no materials which are originally carried by the vehicle discharged from the vehicle.

It is another object of the present invention to provide for propulsion of space vehicles wherein matter in space is utilized in lieu of matter carried aboard the space vehicle.

It is a further object of this invention to provide for propulsion of space vehicles wherein only a source of electrical potential need be carried aboard the space vehicle.

Other objects and many of the attendant advantages of this invention will be readily appreciated as the same becomes better understood by reference to the following detailed description when considered in connection with the accompanying drawings wherein:

FIG. 1 is an isometric view of one embodiment of the invention;

FIG. 2 is a sectional view of the embodiment of FIG. 1 taken along line A—A;

FIG. 3 is an isometric view of another embodiment of the invention;

FIG. 4 is a sectional isometric view of still another embodiment of the invention; and FIG. 5 is a sectional view of a further embodiment of the invention.

The present invention provides propulsion for space vehicles by passage of ions through a metal matrix and a grid positioned, respectively, on opposite sides of the vehicle. Space ions are attracted to the matrix, accelerated, neutralized, and discharged into space with the reverse of the momentum gained by the ions being imparted to the vehicle.

FIGURES 1 and 2 illustrate space vehicle 11 having matrix 12 and grid 13 at the fore and aft ends thereof with matrix 12 maintained negative with respect to the average potential of the vehicle's surface and grid 13 grounded to the surface potential. Space ions 15 are attracted to matrix 12 and accelerated into it by source of potential 16. As shown more clearly in FIG. 2, matrix 12 is electrically insulated from vehicle 11 by insulators 14. Cone 27 designates the sector in space from which ions 15 may be presumed to be attracted to matrix 12, which cylinder 25 designates the portion from which ions traveling parallel to the elements of matrix 12 may be presumed to be attracted. Particles 20 are atomic particles discharged from vehicle 11 and whose direction of travel is the reverse of the direction of momentum 21 imparted to vehicle 11.

In the embodiment of FIG. 3, matrix 12 is a honeycombed structure and grid 13 a mesh—otherwise the embodiment is essentially an alternate to that of FIG. 1. The embodiment of FIG. 4 differs from those previously described in providing forward-extending concentric surfaces 17 which are attached to grid 13 and supported by rods 18. Matrix 12 in the embodiment of FIG. 4 likewise is formed of concentric surfaces 22 supported by rods 23.

FIG. 5 illustrates an embodiment of the invention in which the matrix of previous embodiments is replaced by composite electrode 30 which includes grids 31 and 33 and a foil 32 less than 10 mils thick. Foil 32 may be any of several well known thin film materials such as gold, aluminum or SiO. Composite electrode 30 is maintained at a voltage greater than 1 kv. and preferably in the order of from 30 to 100 kv.

Operation of the invention requires the existence of an ionized plasma or medium in which vehicle 11 is located, and a matrix in the vehicle charged negative with respect to the space ions and to which such ions will be attracted. Because of the attractive force of the matrix, space ions are drawn thereinto with a greater momentum than the ions have prior to being so drawn. The ions are positively charged and since the matrix 12 is negatively charged the force on the space ship is in accordance with Newton's second law of motion. That is, the attractive force on the positive ion pulls the space ship toward the ion medium as the negative matrix pulls the ions toward the negatively charged matrix. In this manner the attractive force between the ions and the space ship tends to cause the spaceship to move toward the attracting ions, thereby imparting a motion on the space ship toward the ions. The ions attracted by the matrix are electrically neutralized while passing therethrough; such neutralized ions then may be discharged through grid 13 without retardation whereas had they not been neutralized the ions would be retarded by grid 13. A relatively small number of ions may be expected to not be neutralized with the result that such ions are decelerated by grid 13, however, the number of ions neutralized is substantially greater than those not neutralized thus imparting a momentum to the vehicle substantially equal in amount to and opposite in direction to the momentum gained by neutralized ions. The gain in momentum of the particles may occur either during approach of the ions to matrix 12 in accordance with Newton's second law of motion as described above or during their passage through the matrix.

Neutralization is effected in all embodiments primarily by contact at grazing incidence upon the metallic surfaces, and in part by charge exchange with neutral molecules having smaller velocities relative to the vehicle than the ions. In the embodiments of FIGS. 1 and 3 those ions approaching from the area of cylinder 25 are more likely to proceed through matrix 12 without contact than those approaching from some angle to the plane of the forward edge of the matrix. In the embodiment of FIG. 4, however, surfaces 17 place a positive potential, or ground potential, between the surface elements of matrix 12 such that virtually all ions entering the matrix of FIG. 4 may expect to be neutralized because the potential of surfaces 17 will repel ions toward the negative surface elements of matrix 12 thereby virtually assuring contact at some point along the negative matrix.

In the embodiment of FIG. 5 many of the positive ions will be neutralized and some will be converted to negative atomic particles which will be additionally impelled upon emergence from composite electrode 30 toward and through grid 13.

It should be noted that by virtue of the charge neutralization of incoming positive ions the vehicle acquires a positive potential relative to the plasma or medium in which it is, except for the highly negative matrix 12. Consequently, all of the vehicle except the matrix repels positive ions and attracts electrons thus preventing ions from entering through grid 13 at the rear of the vehicle. The total electron current to the vehicle equals the total ion current to the matrix at steady state.

It should also be noted that source of potential 16 may be any of several means for applying a steady D.-C. negative potential to matrix 12 relative to the remainder of the vehicle such as solar cells or nuclear fission reactors or other sources of energy to drive power supplies for producing the negative potential. Further, in the embodiment of FIG. 4 interlacing plates 17 are mounted on the rear of and grounded to the vehicle with the base of the plates open to permit neutralized ions 20 to pass out the rear having little or no obstruction to their flight. This feature of minimum obstruction is also included in the embodiments not having interlacing plates or sheets.

The invention avoids the weight and space of a source of ions aboard space vehicles, and, where such a source would be used for operation in an ionized plasma, the invention represents a significant saving in expendable cargo when ionized regions are traversed by the space vehicles. Where solar cells are used, the invention provides propulsion for traversing an ionized medium without using energy in any form from the vehicle.

Obviously many modifications and variations of the present invention are possible in the light of the above teachings. It is therefore to be understood that within the scope of the appended claims the invention may be practiced otherwise than as specifically described.

What is claimed is:

1. Propulsion means for propelling a space vehicle in an ionized plasma without requiring expediture of vehicle cargo comprising:
   (a) an ion neutralizing means positioned within said vehicle for attracting ions within said ionized plasma and neutralizing those attracted ions having grazing incidence with said neutralizing means,
   (b) an inlet in said vehicle in alignment with said neutralizing means for admitting ions toward said ion neutralizing means,
   (c) an outlet in said vehicle in axial alignment with said inlet and said neutralizing means,
   (d) a discharge means positioned adjacent said outlet in said vehicle in alignment with said neutralizing means for permitting emergence of neutralized ions from said vehicle through said outlet,
   (e) said discharge means repelling ions on the outside of said vehicle to prevent said ions from entering said outlet to said vehicle,
   (f) a voltage source,
   (g) said voltage source being electrically connected to said ion neutralizing means to maintain an ion attractive potential thereon and electrically connected to said discharge means to maintain a potential thereon opposite to the potential on said ion neutralizing means, whereby ions are attracted to said neutralizing means, are neutralized and passed through said discharge means and said outlet to the outside of said vehicle.

2. Propulsion means as claimed in claim 1 wherein said ion neutralizing means is negative with respect to said discharge means.

3. Propulsion means for propelling a space vehicle in an ionized plasma without requiring expenditure of vehicle cargo comprising:
   (a) an ion neutralizing means positioned within said vehicle for attracting ions within said ionized plasma and neutralizing those attracted ions having grazing incidence with said neutralizing means,
   (b) said ion neutralizing means comprising a plurality of spaced parallel electrically conductive elongated plates so arranged that attracted ions pass through said neutralizing means between said plates,
   (c) an inlet in said vehicle in alignment with said neutralizing means for admitting ions toward said neutralizing means,
   (d) an outlet in said vehicle in axial alignment with said inlet and said neutralizing means,
   (e) a grid-like discharge means positioned adjacent said outlet in said vehicle in alignment with said neutralizing means for permitting emergence of neutralized ions from said vehicle through said outlet,
   (f) a voltage source,
   (g) said voltage source being electrically connected to said ion neutralizing means to apply a negative potential thereto thereby maintaining an ion attractive potential thereon,
   (h) said source being electrically connected to said grid-like discharge means to apply a positive potential thereto, and
   (i) whereby ions attracted to said neutralizing means are neutralized by grazing incidence and passed through said discharge means and said outlet to the outside of said vehicle.

4. A propulsion means as claimed in claim 3 wherein said ion neutralizing means is formed of a plurality of spaced plates having spacers of the same material as said plurality of plates, in which said spacers are perpendicular to said plurality of plates, parallel to each other and extending the length of said plurality of plates to form a honey-comb-like structure.

References Cited in the file of this patent
UNITED STATES PATENTS

| 2,735,261 | Walker | Feb. 21, 1956 |
| 2,880,337 | Langmuir et al. | Mar. 31, 1959 |
| 3,014,154 | Ehlers et al. | Dec. 19, 1961 |
| 3,050,652 | Baldwin | Aug. 21, 1962 |

OTHER REFERENCES

Scientific American, March 1961, vol. 204, No. 3, pages 57, 58, 61–65.

Flight, March 20, 1959, pages 385–387.